July 28, 1959  B. M. OSOJNAK ET AL  2,896,935
CAR DUMPER

Filed March 8, 1956  4 Sheets-Sheet 1

INVENTORS
Boris M. Osojnak &
Richardson Gray

July 28, 1959

B. M. OSOJNAK ET AL 2,896,935

CAR DUMPER

Filed March 8, 1956

INVENTORS
Boris M. Osojnak &
Richardson Gray
Hooper, Leonard & Buell
their Attorneys July 28, 1959  B. M. OSOJNAK ET AL  2,896,935
CAR DUMPER
Filed March 8, 1956  4 Sheets-Sheet 4

INVENTORS
Boris M. Osojnak &
Richardson Gray

United States Patent Office 2,896,935
Patented July 28, 1959

2,896,935
CAR DUMPER

Boris M. Osojnak, Pittsburgh, and Richardson Gray, Mount Lebanon Township, Allegheny County, Pa., assignors to Heyl & Patterson, Inc., Pittsburgh, Pa., a corporation of Pennsylvania Application March 8, 1956, Serial No. 570,303

15 Claims. (Cl. 265—71)

This invention relates to a car dumper, especially a car dumper for dumping the contents of railroad cars by substantially inverting the cars. The invention is particularly concerned with weighing means used in the car dumper for weighing the car before and after the dumping of its contents whereby to determine the weight of material dumped.

Car dumpers equipped with means for weighing the cars before and after dumping are not new. Such car dumpers have previously been proposed which have comprised a substantially invertible supporting structure for supporting a car during dumping and means for weighing the substantially invertible supporting structure and car together. Such car dumpers have several serious disadvantages. Since the substantially invertible supporting structure must be massive to perform its function of supporting and inverting a railroad car it follows that weighing means of sufficient weighing capacity to weigh the substantially invertible supporting structure and car together must be of great strength and consequently high in cost. Also, since the weight of material dumped is in that case a comparatively small fraction of the total mass being weighed the weighing is not of optimum accuracy.

However, in weighing railroad cars on a car dumper before and after dumping without at the same time weighing the substantially invertible car supporting structure problems are encountered which have not heretofore been satisfactorily solved. Indeed, we do not know of any car dumper equipped with weighing means for weighing a ralroad car before and after dumping which has not weighed the entire substantially invertible supporting structure along with the car.

We have solved the problem by providing a car dumper comprising a substantially invertible supporting structure, means in the supporting structure and invertible therewith for supporting when in upright position a car to be dumped and weighing means interposed between the supporting structure and the first mentioned means so that the car and the first mentioned means to the exclusion of the supporting structure may be weighed. For convenience the means in the supporting structure and invertible therewith for supporting when in upright position a car to be dumped and which is weighed along with the car will be termed the scale platform.

Since the scale platform must of necessity be separate from the substantially invertible supporting structure because the scale platform is to be weighed along with the car while the substantially invertible supporting structure is not to be weighed and since in dumping a car the scale platform is substantially inverted and hence subject to change in position relatively to the substantially invertible supporting structure and since for accurate weighing the scale platform should be in proper vertical alignment with the weighing means when the scale platform is in a generally horizontal position with a car atop it for weighing of the car we provide means connected between the substantially invertible supporting structure and the scale platform acting on the scale platform in a generally horizontal direction during weighing of a car and incapable of transmitting vertical forces of sufficient magnitude to adversely affect the weighing accuracy to maintain the scale platform and the substantially invertible supporting structure in proper vertical alignment with the weighing means. The last mentioned means are preferably relatively light positioning means connected between the substantially invertible supporting structure and the scale platform disposed generally horizontally during weighing of a car to maintain the scale platform and the substantially invertible supporting structure in proper vertical alignment with the weighing means.

The weighing means may comprise load cell means interposed between the substantially invertible supporting structure and the scale platform to weigh the car and scale platform to the exclusion of the substantially invertible supporting structure. The load cell means may be of conventional type; we employ Baldwin load cells manufactured by Baldwin-Lima-Hamilton Corporation of Philadelphia, Pennsylvania. The load cells are positioned to transmit the vertical load from the scale platform to the substantially invertible supporting structure during weighing of a car and are, as well known to those skilled in the art, wired to indicating and/or recording instruments showing the weight of the car and scale platform to the exclusion of the substantially invertible supporting structure.

Due to the size and mass of cars being dumped and weighed in our car dumper a plurality of weighing devices should ordinarily be employed, such devices preferably being disposed at spaced apart locations and respectively interposed in thrust relation between the substantially invertible supporting structure and the scale platform. For example, the weighing devices may be arranged in pairs with the devices of each pair spaced apart transversely of the dumper and the pairs of devices spaced apart longitudinally thereof. Means well known to those skilled in the art may be provided for indicating and/or recording the total mass supported by the plurality of weighing devices at the time of weighing. We find it desirable to connect each weighing device with the substantially invertible supporting structure and with the scale platform in generally pivotal fashion.

It should be mentioned that the term "substantially invertible supporting structure" as used herein means a supporting structure which can be turned so that a car which is initially upright is moved to a position in which its contents will flow out due to gravity. It is, of course, not necessary to turn the car to completely inverted position to accomplish that result. In some cases the car need be turned through little more than 90° from its upright position in order to discharge its contents; the extent of turning necessary for dumping depends upon the nature of the contents being dumped. Normally a car being dumped is turned through an angle of 140° to 160° from its upright position.

It is desirable that means be provided capable of acting in tension during rotation and in compression during weighing connecting the weighing devices with the substantially invertible supporting structure and with the scale platform in order to maintain connection between the scale platform and the substantially invertible supporting structure in case the substantially invertible supporting structure should be substantially inverted when there is no car on the scale platform. We find that button head studs are very satisfactory for connecting the weighing devices with the substantially invertible supporting structure and with the scale platform.

In a preferred structure our car dumper may comprise a substantially invertible supporting structure, means in the supporting structure and invertible therewith for supporting when in upright position a car to be dumped and a plurality of load cells interposed in thrust relation between the supporting structure and the first mentioned means and connected with each thereof in generally pivotal fashion together with means connected between the supporting structure and the first mentioned means in a generally horizontal direction during weighing of a car and incapable of transmitting vertical forces of sufficient magnitude to adversely affect the weighing accuracy to maintain the first mentioned means in proper vertical alignment with the weighing means.

Other details, objects and advantages of the invention will become apparent as the following description of certain present preferred embodiments thereof proceeds.

In the accompanying drawings we have shown certain present preferred embodiments of the invention in which:

Figure 3 is a partial plan view to enlarged scale of the car dumper, the portion shown being approximately the right hand half viewing Figure 2;

Figure 4 is a vertical central longitudinal cross-section to enlarged scale taken on the line V—V of Figure 3;

Figure 1:
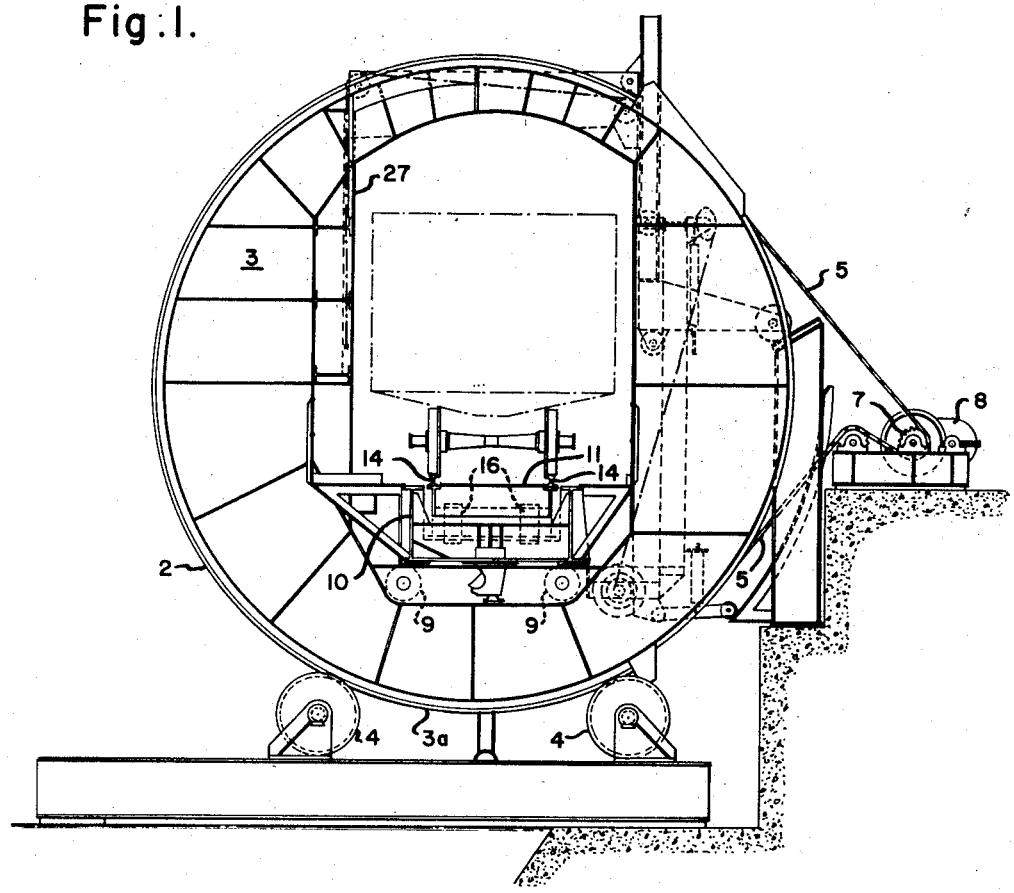
Figure 1 is an end elevational view of a car dumper embodying our invention.

The drawings have been prepared in simplified fashion to illustrate the invention and to omit so far as practicable features which are conventional in the car dumper art and which would be understood by any person skilled in the art without being specifically shown and described.

We have chosen to illustrate our invention as embodied in a car dumper of the general type disclosed in United States Patent No. 2,634,006. The dumper comprises a substantially invertible supporting structure designated generally by reference numeral 2 and which is generally in the form of a hollow skeleton or framework having rings 3 rotatably supported upon flanged rollers 4. Disposed about the periphery of each ring 3 and forming in effect an integral part of the ring is a rail 3a disposed between the flanges of the supporting rollers 4. The supporting structure is turned upon the rollers 4 by any suitable means, as, for example, two sprocket chains 5 each extending at least partially about one of the rings 3. Each of the chains 5 is driven by a sprocket 7 which in turn is driven by a motor and reduction gearing 8.

Figure 1 shows the supporting structure 2 in its extreme position in the clockwise direction; in other words, in operation of the car dumper the supporting structure 2 turns only counterclockwise from the position of Figure 1 and back again. As indicated above it will normally turn about 140° to 160° to dump a car disposed in it.

The dumper is provided with means for holding a car in position therein and other cooperating mechanisms well known to those skilled in the art. We shall not describe the conventional portions of the apparatus but shall confine the description to the portions with which our invention is concerned.

The supporting structure 2 carries rollers 9 mounted to rotate freely about fixed axes extending horizontally and lengthwise of the dumper. Supported by the rollers 9 is a carrier 10 forming a part of the substantially invertible supporting structure but adapted to shift upon the rollers 9 when a car is being dumped. The carrier 10 comprises longitudinal members 32 and transverse members 33. The operation of the carrier 10 on the rollers 9 may be conventional and is well known to those skilled in the art.

Disposed generally within the carrier 10 is the scale platform which is designed generally by reference numeral 11. It comprises longitudinally extending I-beams 12 joined by transverse members 13. The scale platform 11 carries car supporting rails 14 atop the respective I-beams 12, the rails 14 extending the length of the dumper and being aligned with rails 15 permanently mounted opposite the ends of the dumper so that cars may pass into the dumper from one end thereof and pass from the dumper at the opposite end thereof after being dumped.

Interposed between the carrier 10 and the scale platform 11 are weighing devices shown as being in the form of load cells 16. In the structure shown there are eight load cells 16 arranged in four pairs with the cells of each pair spaced apart transversely of the dumper and with the pairs of cells spaced apart longitudinally of the dumper. Each of the load cells 16 is connected with each of the carrier and scale platform in generally pivotal fashion. In the structure shown in Figure 5 button head studs 17 the outer surfaces of whose heads are generally spherically curved are connected with each end of each load cell and the head of each such stud is contained within a cage 18. The cages 18 are connected respectively with the carrier and scale platform so that when the parts are in normal position the load cells 16 are vertical. The ends of the button head studs bear against plates 19 and the peripheries of the heads of the studs are spaced but slightly from the inside walls of the cages 18, rings 20 of plastic or other suitable material such as Fabreeka being disposed against the under sides of the heads of the button head studs and contained in or forming part of the cages. Thus the load cells are mounted for limited substantially pivotal or universal joint movement with respect to each of the carrier and scale platform. As is well known to those skilled in the art, the magnitude of the force exerted axially against the load cells is indicated by the indicating or recording instrument or instruments connected therewith so that the load cells collectively constitute weighing means for weighing the scale platform and the car carried on the rails 14 thereof without weighing any other part of the dumper. The load cells are mounted to act both in tension and in compression so that if the substantially invertible supporting structure 2 is moved to the position corresponding to car dumping position but without a car in the dumper the scale platform will not fall down but will be maintained connected with the carrier by the load cells. Means which are conventional and well known to those skilled in the art are provided for holding the carrier 10 against falling down if the substantially invertible supporting structure 2 is substantially inverted without a car in the dumper.

Figure 6:
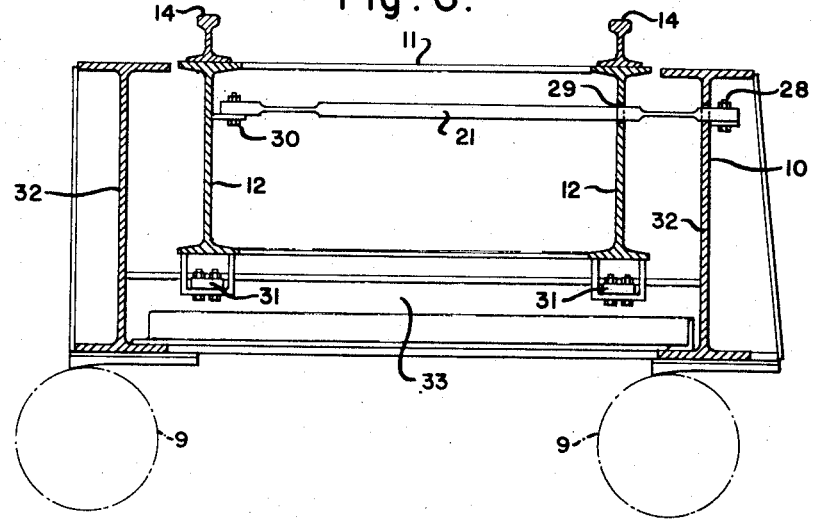
Figure 6 is a vertical transverse cross-sectional view to enlarged scale taken on the line VI—VI of Figure 3.

Since the dumping action has a tendency to interfere with normal alignment of the load cells relatively to the carrier and scale platform we provide means shown in the drawings (see particularly Figure 6) as in the form of relatively light rods 21 connected between the carrier 10 and the scale platform 11 acting in a generally horizontal direction during weighing of a car and incapable of transmitting vertical forces of sufficient magnitude to adversely affect the weighing accuracy to maintain the scale platform in proper vertical alignment with the load cells. Any suitable number of such rods or equivalent devices may be provided. They simply inhibit lateral shifting of the scale platform relatively to the carrier but have no substantial effect on the imposition upon the load cells of the entire mass of the scale platform and anything carried by it during the weighing operation. Figure 6 shows one of the rods 21 connected at 28 to the carrier 10 and extending through an opening 29 in the nearer I-beam 12 of the scale platform 11 and connected to the other I-beam at 30.

Longitudinally extending rods 31 similar to the rods 21 and functioning in a similar manner connect the carrier 10 and the scale platform 11 to restrain relative movement therebetween longitudinally of the dumper upon movement of cars or locomotives over the rails 14. The rods 31, like the rods 21, are of relatively light construction and incapable of transmitting vertical forces of sufficient magnitude to adversely affect the weighing accuracy when a car is being weighed.

Figure 5:
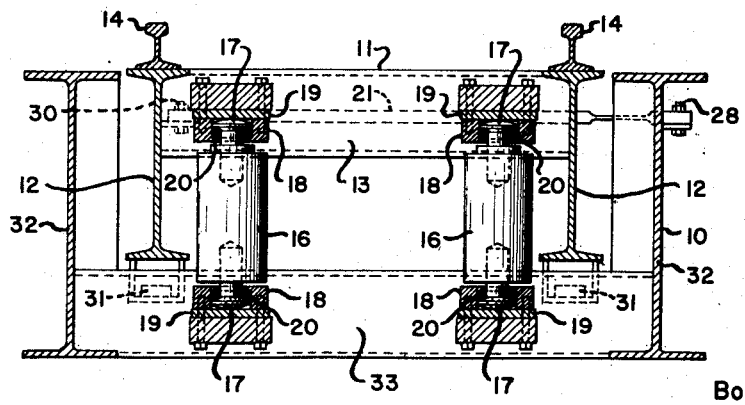
Figure 5 is a vertical transverse cross-sectional view to enlarged scale taken on the lineV —V of Figure 3.
Figure 2:
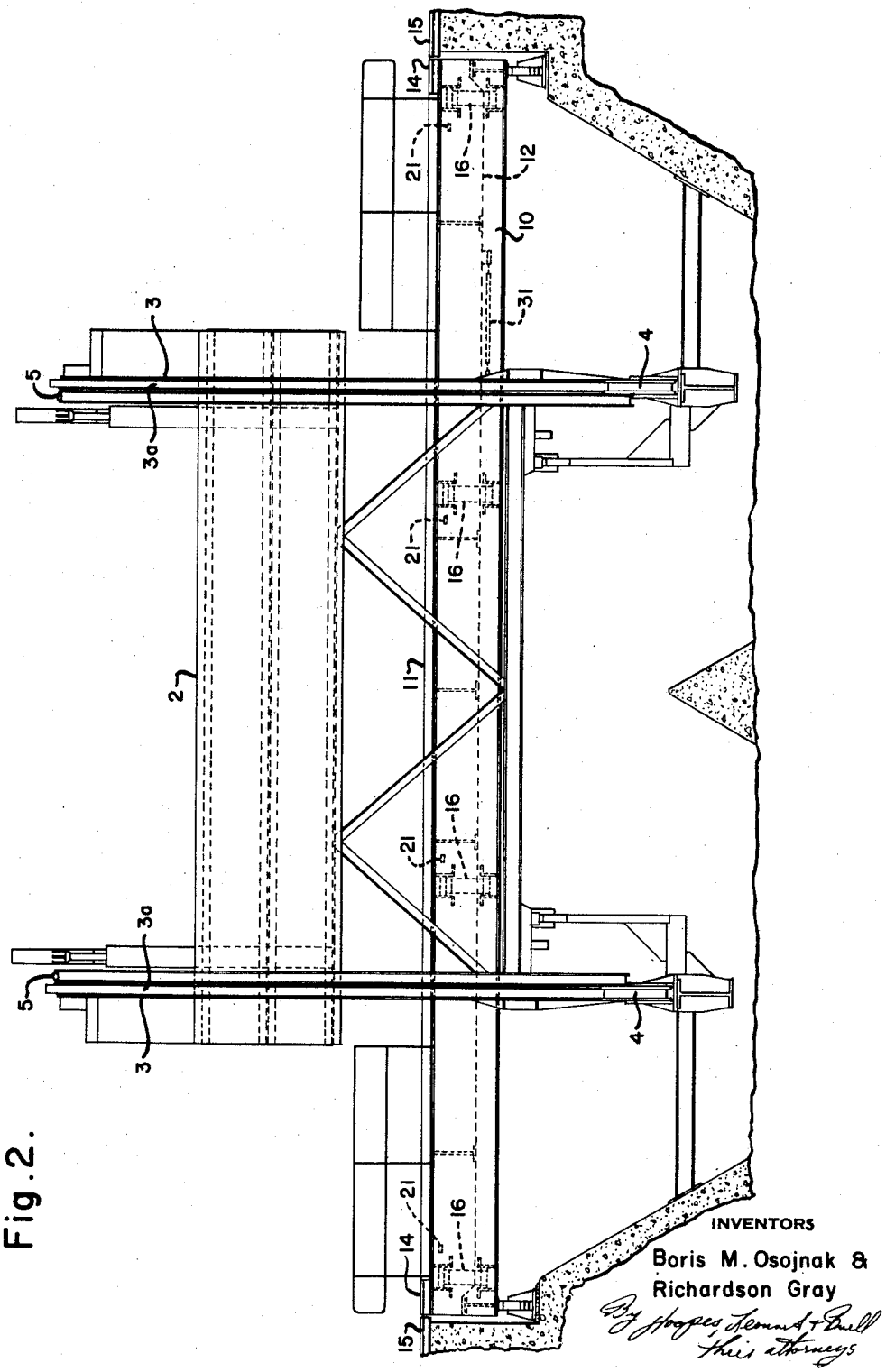
Figure 2 is a side elevational view of the car dumper.
Figure 7:
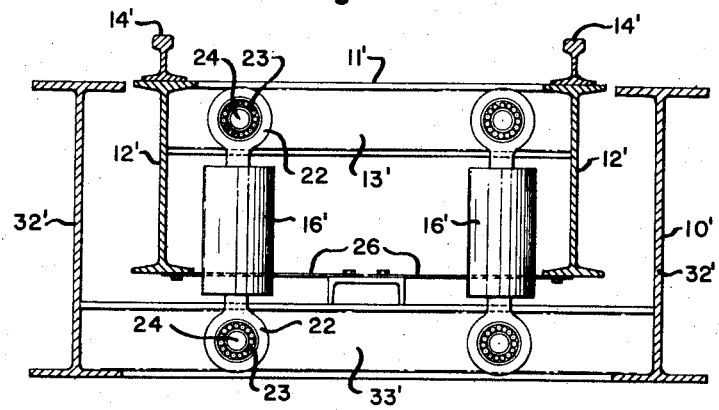
Figure 7 is a view similar to Figure 5 of a modified structure.

Figure 7 shows a structure analogous in function to that of Figure 5 but of somewhat different form. Parts in Figure 7 corresponding to parts in Figure 5 are designated by the same reference numerals each with a prime affixed. In Figure 7 the load cells 16' are connected with the carrier 10' and the scale platform 11' by eye-bolts 22. A self-aligning bearing 23 which may, for example, be a spherical roller bearing is disposed within the eye of each of the eye-bolts 22 and a bolt 24 extends within each bearing and in the case of each of the two upper eye-bolts 24 is connected with the scale platform 11' as by passing through a pair of adjacent transverse members 13' between which the eye-bolt is positioned and in the case of each of the two lower eye-bolts 24 is connected with the carrier 10' as by passing through a pair of adjacent transverse members 33' between which the eye-bolt is positioned. The connections between the respective eye-bolts and the scale platform on the one hand and the carrier on the other hand are thus in the nature of universal joint connections. The structure of Figure 7 is analogous to that of Figure 5 except that in Figure 7 the eye-bolt and bearing structure just described is employed to provide for the connection in generally pivotal or universal joint fashion between the load cells and the carrier on the one hand and the scale platform on the other hand whereas the shape of the button head studs accomplishes the same result in the structure shown in Figure 5. Also in Figure 7 rods 26 tie the scale platform in lateral position relatively to the carrier but do not adversely affect the weighing accuracy and perform the same function as the rods 21 previously described.

When a loaded car has been moved into place in the dumper it is first weighed by the load cells as above explained. During dumping the car is held down against the rails 14 by means mentioned above which are conventional and well known to those skilled in the art and which therefore are not described. The substantially invertible supporting structure 2 is turned until the car is dumped, after which the direction of rotation of such structure is reversed and the parts return to the position shown. In Figure 1. The rods 21 or 26 as the case may be insure proper centering of the scale platform so that the load cells are perpendicular to the scale platform and to the carrier to weigh the scale platform with the empty car thereon. After the empty car is weighed it is moved out of the dumper to make room for another car. The weight of material dumped is the difference between the weight of the scale platform and the loaded car before dumping and the weight of the scale platform and the empty car after dumping.

Load cells or other weighing means of generally less capacity and structures of simpler less costly design are required when our invention is employed in comparison with those required when the entire substantially invertible structure is weighed as has heretofore always been the case so far as we are aware. As pointed out above the weight of material dumped is a much greater fraction of the total weight recorded than according to the prior practice, resulting in more accurate weighing. Thus we obtain improved results in weighing with a structure of reduced cost.

While we have shown and described certain present preferred embodiments of the invention it is to be distinctly understood that the invention is not limited thereto but may be otherwise variously embodied within the scope of the following claims.

We claim:

1. A car dumper comprising a substantially invertible supporting structure, means in the supporting structure and invertible therewith for supporting when in upright position a car to be dumped, a plurality of weighing devices interposed in thrust relation between the supporting structure and the first mentioned means and means constructed and arranged to sustain tensile stress and also to sustain compressive stress connecting the weighing devices with the supporting structure and the first mentioned means.

2. A car dumper comprising a substantially invertible supporting structure, means in the supporting structure and invertible therewith for supporting when in upright position a car to be dumped, button head studs and a plurality of weighing devices connected with the supporting structure and invertible therewith interposed in thrust relation between the supporting structure and the first mentioned means and connected with each thereof by the button head studs.

3. A car dumper comprising a substantially invertible supporting structure, means in the supporting structure and invertible therewith for supporting when in upright position a car to be dumped, button head studs, a plurality of load cells constituting weighing means connected with the supporting structure and invertible therewith interposed in thrust relation between the supporting structure and the first mentioned means and connected with each thereof by the button head studs and positioning rods connected between the supporting structure and the first mentioned means disposed generally horizontally during weighing of a car to maintain the supporting structure and the first mentioned means in proper vertical alignment with the weighing means.

4. A car dumper comprising a substantially invertible supporting structure, means in the supporting structure and invertible therewith for supporting when in upright position a car to be dumped, weighing means interposed between the supporting structure and the first mentioned means and means acting in compression when the first mentioned means is in upright position to weigh a car and acting in tension when the first mentioned means is in substantially inverted position without having a car thereon to maintain connection through the weighing means between the supporting structure and the first mentioned means.

5. A car dumper comprising a substantially invertible supporting structure, means in the supporting structure and invertible therewith for supporting when in upright position a car to be dumped, a plurality of weighing devices interposed between the supporting structure and the first mentioned means and means acting in compression when the first mentioned means is in upright position to weigh a car and acting in tension when the first mentioned means is in substantially inverted position without having a car thereon to maintain connection through the weighing devices between the supporting structure and the first mentioned means.

6. A car dumper comprising a substantially invertible supporting structure, means in the supporting structure and invertible therewith for supporting when in upright position a car to be dumped, a plurality of load cells interposed between the supporting structure and the first mentioned means and means acting in compression when the first mentioned means is in upright position to weigh a car and acting in tension when the first mentioned means is in substantially inverted position without having a car thereon to maintain connection through the load cells between the supporting structure and the first mentioned means.

7. A car dumper comprising a substantially invertible supporting structure, means in the supporting structure and invertible therewith for supporting when in upright position a car to be dumped, weighing means connected with the supporting structure and invertible therewith interposed between the supporting structure and the first mentioned means so that the car and the first mentioned means to the exclusion of the supporting structure may be weighed and means including a button head stud having a generally rounded bearing surface and a relatively flat surface against which the generally rounded bearing surface of the button head stud bears connecting the weighing means with the first mentioned means.

8. A car dumper comprising a substantially invertible supporting structure, means in the supporting structure and invertible therewith for supporting when in upright position a car to be dumped, weighing means connected with the supporting structure and invertible therewith interposed between the supporting structure and the first mentioned means so that the car and the first mentioned means to the exclusion of the supporting structure may be weighed and means including a button head stud having a generally rounded bearing surface and a relatively flat surface against which the generally rounded bearing surface of the button head stud bears connecting the weighing means with each of the supporting structure and the first mentioned means.

9. A combination car dumper and car weighing device comprising a base, a supporting structure carried by the base and mounted thereon so as to be substantially invertible, means for substantially inverting the supporting structure, the supporting structure having a car receiving space therein, a carrier mounted in the supporting structure and invertible therewith, weighing means comprising a scale platform and a weighing device mounted in the carrier in substantially fixed position with respect to the carrier in all positions of the supporting structure during inversion thereof, the weighing means being disposed in the supporting structure so as to be positioned generally at the bottom of the car receiving space when the supporting structure is upright, car supporting means carried by the scale platform for supporting a car in the car receiving space when the supporting structure is upright and means carried by the supporting structure cooperating with the car supporting means to support the car while the car is being dumped, whereby a car may be run into the car receiving space onto the car supporting means and weighed without weighing the base, supporting structure or carrier and may immediately thereafter be dumped without being removed from the car receiving space.

10. A combination car dumper and car weighing device comprising a base, a supporting structure carried by the base and mounted thereon so as to be substantially invertible, means for substantially inverting the supporting structure, the supporting structure having a car receiving space therein, a carrier mounted in the supporting structure and invertible therewith, weighing means comprising a scale platform and a weighing device mounted in the carrier in substantially fixed position with respect to the carrier in all positions of the supporting structure during inversion thereof, the weighing means being disposed in the supporting structure so as to be positioned generally at the bottom of the car receiving space when the supporting structure is upright, means carried by the supporting structure cooperating with the car supporting means to support the car while the car is being dumped, whereby a car may be run into the car receiving space onto the car supporting means and weighed without weighing the base, supporting structure or carrier and may immediately thereafter be dumped without being removed from the car receiving space and means connected between the supporting structure and the car supporting means acting on the car supporting means in a generally horizontal direction during weighing of a car and incapable of transmitting vertical forces of sufficient magnitude to adversely affect the weighing accuracy to maintain the supporting structure and the car supporting means in proper vertical alignment with the weighing means.

11. A combination car dumper and car weighing device comprising a base, a supporting structure carried by the base and mounted thereon so as to be substantially invertible, means for substantially inverting the supporting structure, the supporting structure having a car receiving space therein, a carrier mounted in the supporting structure and invertible therewith, weighing means comprising a scale platform and a weighing device mounted in the carrier in substantially fixed position with respect to the carrier in all positions of the supporting structure during inversion thereof, the weighing means being disposed in the supporting structure so as to be positioned generally at the bottom of the car receiving space when the supporting structure is upright, car supporting means carried by the scale platform for supporting a car in the car receiving space when the supporting structure is upright, means carried by the supporting structure cooperating with the car supporting means to support the car while the car is being dumped, whereby a car may be run into the car receiving space onto the car supporting means and weighed without weighing the base, supporting structure or carrier and may immediately thereafter be dumped without being removed from the car receiving space and relatively light positioning means connected between the supporting structure and the car supporting means disposed generally horizontally during weighing of a car to maintain the supporting structure and the car supporting means in proper vertical alignment with the weighing means.

12. A combination car dumper and car weighing device comprising a base, a supporting structure carried by the base and mounted thereon so as to be substantially invertible, means for substantially inverting the supporting structure, the supporting structure having a car receiving space therein, a carrier mounted in the supporting structure and invertible therewith, weighing means comprising a scale platform and a weighing device including load cell means mounted in the carrier in substantially fixed position with respect to the carrier in all positions of the supporting structure during inversion thereof, the weighing means being disposed in the supporting structure so as to be positioned generally at the bottom of the car receiving space when the supporting structure is upright, car supporting means carried by the scale platform for supporting a car in the car receiving space when the supporting structure is upright and means carried by the supporting structure cooperating with the car supporting means to support the car while the car is being dumped, whereby a car may be run into the car receiving space onto the car supporting means and weighed without weighing the base, supporting structure or carrier and may immediately thereafter be dumped without being removed from the car receiving space.

13. A combination car dumper and car weighing device comprising a base, a supporting structure carried by the base and mounted thereon so as to be substantially invertible, means for substantially inverting the supporting structure, the supporting structure having a car receiving space therein, a carrier mounted in the supporting structure and invertible therewith, weighing means comprising a scale platform and a plurality of weighing devices interposed in thrust relation between the carrier and the scale platform and disposed in substantially fixed position with respect to the carrier in all positions of the supporting structure during inversion thereof, the weighing means being disposed in the suporting structure so as to be positioned generally at the bottom of the car receiving space when the supporting structure is upright, car supporting means carried by the scale platform for supporting a car in the car receiving space when the supporting structure is upright and means carried by the supporting structure cooperating with the car supporting means to support the car while the car is being dumped, whereby a car may be run into the car receiving space onto the car supporting means and weighed without weighing the base, supporting structure or carrier and may immediately thereafter be dumped without being removed from the car receiving space.

14. A combination car dumper and car weighing device comprising a base, a supporting structure carried by the base and mounted thereon so as to be substantially invertible, means for substantially inverting the supporting structure, the supporting structure having a car receiving space therein, a carrier mounted in the supporting structure and invertible therewith, weighing means comprising a scale platform and a plurality of weighing devices interposed in thrust relation between the carrier and the scale platform and connected with each of the carrier and the scale platform in generally pivotal fashion and disposed in substantially fixed position with respect to the carrier in all positions of the supporting structure during inversion thereof, the weighing means being disposed in the supporting structure so as to be positioned generally at the bottom of the car receiving space when the supporting structure is upright, car supporting means carried by the scale platform for supporting a car in the car receiving space when the supporting structure is upright and means carried by the supporting structure cooperating with the car supporting means to support the car while the car is being dumped, whereby a car may be run into the car receiving space onto the car supporting means and weighed without weighing the base, supporting structure or carrier and may immediately thereafter be dumped without being removed from the car receiving space.

15. A combination car dumper and car weighing device comprising a base, a supporting structure carried by the base and mounted thereon so as to be substantially invertible, means for substantially inverting the supporting structure, the supporting structure having a car receiving space therein, a carrier mounted in the supporting structure and invertible therewith, weighing means comprising a scale platform and a plurality of load cells mounted in the carrier in substantially fixed position with respect to the carrier in all positions of the supporting structure during inversion thereof, the weighing means being disposed in the supporting structure so as to be positioned generally at the bottom of the car receiving space when the supporting structure is upright, car supporting means carried by the scale platform for supporting a car in the car receiving space when the supporting structure is upright and means carried by the supporting structure cooperating with the car supporting means to support the car while the car is being dumped, whereby a car may be run into the car receiving space onto the car supporting means and weighed without weighing the base, supporting structure or carrier and may immediately thereafter be dumped without being removed from the car receiving space.

References Cited in the file of this patent

UNITED STATES PATENTS

| | | |
|---|---|---|
| 2,453,551 | Statham | Nov. 9, 1948 |
| 2,634,006 | Criner et al. | Apr. 7, 1953 |
| 2,673,082 | Thurston | Mar. 23, 1954 |
| 2,716,547 | Thurston | Aug. 30, 1955 |
| 2,757,923 | Lefsheik | Aug. 7, 1956 |
| 2,759,079 | Norman | Aug. 14, 1956 |
| 2,779,583 | Bone | Jan. 21, 1957 |
| 2,815,480 | Ruge | Dec. 3, 1957 |

FOREIGN PATENTS

| | | |
|---|---|---|
| 228,105 | Germany | Nov. 3, 1910 |
| 229,185 | Germany | Dec. 3, 1910 |
| 616,223 | Germany | July 23, 1935 |
| 974,974 | France | Oct. 4, 1950 |